(12) United States Patent
Holstein et al.

(10) Patent No.: US 8,872,374 B2
(45) Date of Patent: Oct. 28, 2014

(54) UNDERWATER POWER PLANT HAVING REMOVABLE NACELLE

(75) Inventors: Benjamin Holstein, Heidenheim (DE); Norman Perner, Neu-Ulm (DE); Rolf Hoffmann, Steinheim (DE); Andreas Lange, Zang (DE); Michael Holle, Sohnstetten (DE)

(73) Assignee: Voith Patent GmbH, Heidenheim (DE)

( * ) Notice: Subject to any disclaimer, the term of this patent is extended or adjusted under 35 U.S.C. 154(b) by 175 days.

(21) Appl. No.: 12/998,322

(22) PCT Filed: Nov. 23, 2009

(86) PCT No.: PCT/EP2009/008315
§ 371 (c)(1),
(2), (4) Date: Jun. 27, 2011

(87) PCT Pub. No.: WO2010/063385
PCT Pub. Date: Jun. 10, 2010

(65) Prior Publication Data
US 2011/0316282 A1 Dec. 29, 2011

(30) Foreign Application Priority Data
Dec. 2, 2008 (DE) .................. 10 2008 059 891

(51) Int. Cl.
*F03B 13/00* (2006.01)
*F03B 17/06* (2006.01)
*F03B 13/10* (2006.01)
*H01F 38/14* (2006.01)

(52) U.S. Cl.
CPC ............. *F03B 13/10* (2013.01); *F05B 2240/97* (2013.01); *F05B 2230/60* (2013.01); *F03B 17/061* (2013.01); *Y02E 10/28* (2013.01); *H01F 38/14* (2013.01); *Y02E 10/22* (2013.01); *F03B 17/063* (2013.01)
USPC ............................................ 290/54; 290/43

(58) Field of Classification Search
CPC ....... F03B 13/10; F03B 17/061; F03B 17/063; F05B 2230/60; F05B 2240/97; H01F 38/14; Y02E 10/22; Y02E 10/28
See application file for complete search history.

(56) References Cited

U.S. PATENT DOCUMENTS

| 5,703,461 A | 12/1997 | Minoshima |
| 6,963,263 B1 | 11/2005 | Cook |
| 7,859,128 B2 * | 12/2010 | Gibberd et al. ................. 290/54 |

(Continued)

FOREIGN PATENT DOCUMENTS

| DE | 10 2007 002 338 | 4/2008 |
| DE | 10 2007 024 528 | 11/2008 |

(Continued)

*Primary Examiner* — Pedro J Cuevas
*Assistant Examiner* — S. Mikaloff
(74) *Attorney, Agent, or Firm* — Farjami & Farjami LLP

(57) ABSTRACT

Presented is an underwater power plant including a support structure, a nacelle, the support structure and the nacelle being detachably connectable to one another via a coupling device, a water turbine, the water turbine at least indirectly drives an electrical generator that is received in the nacelle, and an inductive transmission device, where inductive transmission device transmits power generated by the electrical generator from the nacelle in a contactless manner to the support structure, and where the inductive transmission device includes a transformer with a primary side and a secondary side, the primary side is assigned to the nacelle and the secondary side is assigned to the support structure.

3 Claims, 2 Drawing Sheets

(56) References Cited

U.S. PATENT DOCUMENTS

| | | | |
|---|---|---|---|
| 8,368,242 B2* | 2/2013 | Holstein et al. | 290/54 |
| 2007/0141887 A1* | 6/2007 | Kuo et al. | 439/281 |
| 2009/0045631 A1* | 2/2009 | Gibberd et al. | 290/53 |
| 2009/0302611 A1* | 12/2009 | Masters et al. | 290/53 |
| 2010/0052325 A1* | 3/2010 | Perner et al. | 290/52 |
| 2010/0201129 A1* | 8/2010 | Holstein et al. | 290/53 |
| 2010/0225114 A1* | 9/2010 | Perner et al. | 290/53 |
| 2010/0295309 A1* | 11/2010 | Holstein et al. | 290/52 |
| 2011/0155682 A1* | 6/2011 | Grassow et al. | 212/270 |
| 2011/0170954 A1* | 7/2011 | Holstein et al. | 405/195.1 |
| 2012/0228878 A1* | 9/2012 | Perner et al. | 290/54 |
| 2012/0272614 A1* | 11/2012 | Perner et al. | 52/745.17 |
| 2012/0286518 A1* | 11/2012 | Arlitt et al. | 290/54 |

FOREIGN PATENT DOCUMENTS

| | | | |
|---|---|---|---|
| GB | 2 437 534 | 10/2007 | |
| WO | WO 98/09303 | 3/1998 | |
| WO | WO 02/44558 | 6/2002 | |
| WO | WO 02/066828 | 8/2002 | |
| WO | WO 2007/125349 | 11/2007 | |
| WO | WO 2007125349 A2 * | 11/2007 | F03B 13/26 |

* cited by examiner

UNDERWATER POWER PLANT HAVING REMOVABLE NACELLE

The invention relates to an underwater power plant having a removable nacelle according to the preamble of the independent claims, in particular for obtaining power from a tidal current.

Underwater power plants, used for obtaining energy from a tidal current and which are implemented without a dam structure and having free flow surrounding them, are known. Such freestanding power plants can also be used for other flowing bodies of water. For such plants, a water turbine is at least indirectly driven by the water current, flowing around the nacelle and driving an electrical generator, housed inside the nacelle. The nacelle is mounted on a support structure, which can either be placed on a foundation on the body of water floor or can be implemented as a floating unit. The mounting of the nacelle on the support structure can be rigidly implemented. Alternatively, the nacelle can be fastened as a rotatable unit on the support structure such that the water turbine is capable of following the water current in the case of a varying inflow direction.

To perform a maintenance measure and to simplify the installation, a modularly constructed underwater power plant has been proposed for example by EP 1 366 287 A1. A foundation is first constructed from individual components on the body of water floor, having a support structure constructed thereon. The nacelle is subsequently lowered along a guide cable configuration to the support structure. A power cable, which originates from the electrical generator or the power-electronic components in the nacelle, is laid by service divers in a guide channel on the support structure. This type of installation is complex and hazardous because of the use of the service divers. Furthermore, raising of the nacelle to execute a plant service above the water line proves to be equally difficult.

To simplify the cable guiding, GB 2 437 534 A proposes for a modular underwater power plant to use a rigid pipe connecting piece on the nacelle, which receives and protects a first portion of the power cable. The constructive outlay for implementing the connecting piece is a disadvantage of such a design. In addition, this plant part interferes with the handling of the nacelle. This relates to the initial installation and to maintenance work, which is executed on board a vessel. For this case, the connecting piece protruding from the housing of the nacelle would require a large-dimensioned crane and a handling system onboard the vessel.

A power cable, which is an external element after the plant installation, represents a component which is susceptible to wear because of the continuous movement due to the surrounding water current. This leads to fatigue problems, that cannot be entirely overcome by a segmented cable protection system. In addition, the cable located in the water current can result in vibrations. Furthermore, a fastening on the support structure is to be provided, which ensures a sufficient distance from the orbit of the water turbine during operation, which is complex.

There are further problems of the known, modular underwater power plants due to a rotatable linkage of the nacelle to the support structure allowing the turbine to follow a variable inflow direction. For this case, an excessively strong twisting of the power cable originating from the nacelle has to be avoided. For actively motorized azimuthal rotational devices, a continuous change of the rotational direction, in the simplest case a back-and-forth movement, can be executed to avoid these problems. However, passive azimuthal rotation devices are preferred to simplify the system. To avoid the twisting for such a device, it was proposed by DE 10 2007 002 338 B3 that the azimuthal rotation has to be synchronized with the intrinsic rotation of a centrally running power cable. However, this requires an additional design effort for coupling the rotational movements of the nacelle and the power cable.

The object of the invention is to provide a modular underwater power plant having a nacelle which is removably fastened on a support structure, whose coupling and decoupling is simplified. In particular, the power cable for transmitting the electrical power generated by the electrical generator within the nacelle has to be reliably protected during installation and removal and during normal plant operation. For a refinement, the nacelle in the coupled state should be able to rotate around the support structure, in order to follow a directional change of the inflow, without the occurrence of cable twisting.

To achieve this object, the inventors have recognized that a modular underwater power plant should transmit the electrical power generated by the electrical generator in the nacelle inductively and therefore in a contactless manner to the support structure. For this purpose, an inductive transmission device can be provided between the nacelle and the water turbine, which is detachable, and thus allows coupling and decoupling of the nacelle and the support structure. For a first embodiment, the inductive transmission device can be implemented by a transformer. In the case of a directionally-rigid coupling of the underwater power plant to the support structure, a transformer can be used, whose primary side is assigned to the nacelle and whose secondary side is assigned to the support structure. The use of a plurality of such transformers is conceivable, which can be implemented as a part of or in the area of the coupling device for connecting the nacelle to the support structure.

To implement an underwater power plant having a nacelle, linked rotatably on the support structure, the inductive transmission device according to the invention is designed with components being mobile with respect to each other. A preferred embodiment concerns the use of a rotary transformer, which is implemented as an electrical generator, for example, as an asynchronous machine having a wound rotor, which is secured by a brake. An induction machine having a rotor feed to implement a rotary transformer is particularly preferred.

An alternative embodiment of the invention provides implementing of the electrical generator, which is at least indirectly driven by the water turbine in operation, as a divisible component for realizing the inductive transmission device. The rotor of the electrical generator is assigned to the nacelle and the stator of the electrical generator is assigned to the support structure. Accordingly, the electrical generator is divisible and can correspondingly be assigned to the two halves of the coupling device. The two parts can be separated or connected in the submerged state.

For installation, the support structure lowered with the generator stator. In a subsequent installation step, the revolving unit with the rotor is placed on the support structure, the coupling device allowing detachment and decoupling of the revolving unit. In the case of a plant service, the revolving unit having the generator rotor is raised to the water surface, while the generator stator remains on the support structure, since these plant components are essentially maintenance-free.

The above-mentioned embodiment of the invention having a divisible electrical generator is advantageously implemented having a flooded air gap. Furthermore, the bearing components are advantageously designed as water-lubricated friction bearings, so that the revolving unit is coupled to the initially exposed rotor of the electrical generator underwater.

Furthermore, to simplify the coupling, complementary guide units are provided on the revolving unit and the water turbine, which cause self-centering.

The invention is described in further detail hereinafter on the basis of exemplary embodiments and in conjunction with the figures, showing the following:

Figure 1:
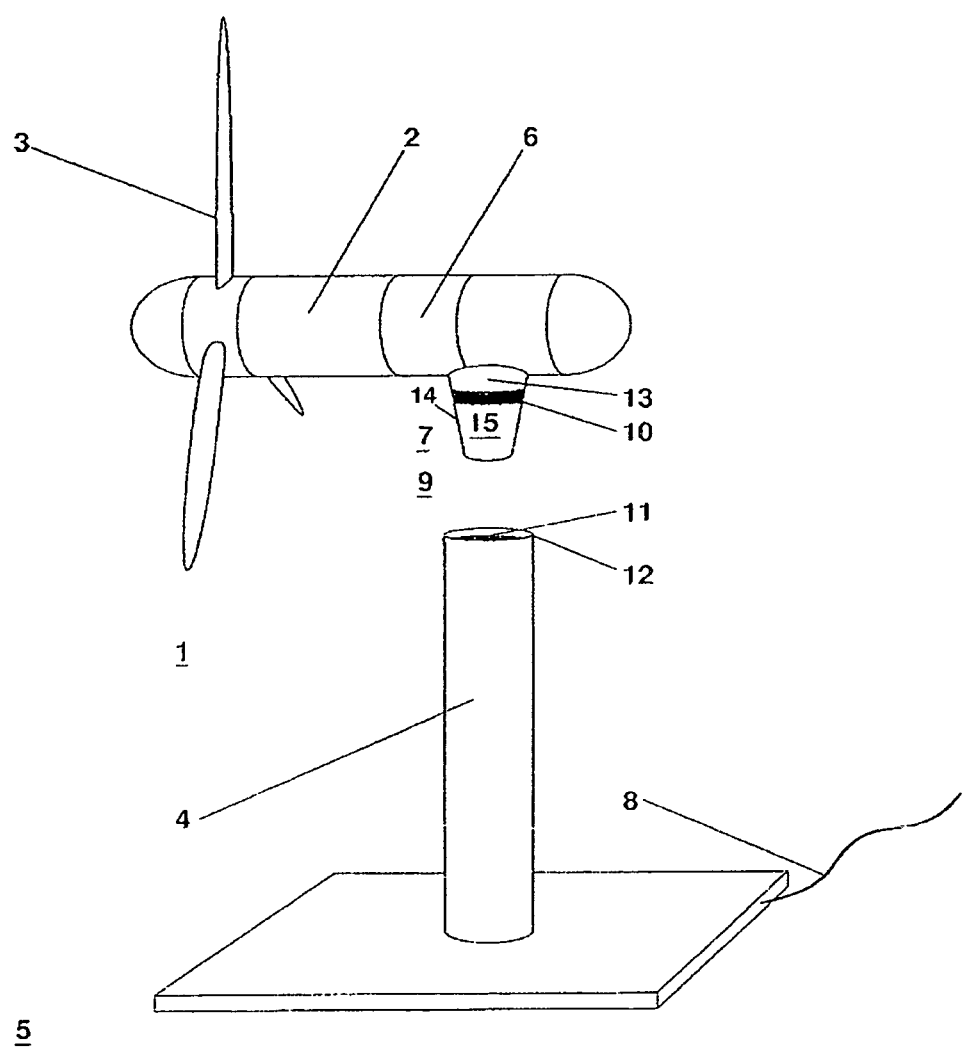
FIG. 1 shows a modularly constructed underwater power plant according to the invention, having a nacelle decoupled from the support structure.

FIG. 1 shows schematically simplified an underwater power plant in accordance with the invention. It is constructed modularly corresponding to the generic plant and has a support structure 4, which, in the present case, reaches to the body of water floor 5. A nacelle 2, which in turn carries a water turbine 3, can be coupled onto this support structure 4. For the present embodiment, an electrical generator 6 is additionally arranged within the nacelle 2. This generator is at least indirectly driven by the water turbine 3 and converts the kinetic energy absorbed from the water current into electrical power. A coupling device 15 is provided for coupling the nacelle 2 on the support structure 4. For the illustrated exemplary embodiment, it comprises a receptacle 12 in the support structure 4 and a connecting element 13, which is connected to the nacelle 2. Receptacle 12 and connecting element 13 have complementary guide elements 14 in the form of conical running surfaces for the self-centering. Further centering and locking means (not shown in detail) of the coupling device can be provided to implement a detachable connection of the nacelle 2 onto the support structure 4.

According to the invention, the modularly constructed underwater power plant 1 has an inductive transmission device 7, which is used for transmitting electrical power generated by the electrical generator 6 in a contactless manner from the nacelle 2 to the support structure 4. For this purpose, the inductive transmission device 7 can comprise a transformer 9, whose primary side 10 is assigned to the nacelle 2 and whose secondary side 11 is assigned to the support structure 4. The inductive transmission device 7 can be part of the coupling device 15, as shown, or can be implemented in proximity thereto. Because of the self-centering of the coupling device 15 caused by the complementary guide elements 14, the components of the transformer 9, guided towards each other during the coupling operation, can be precisely positioned with respect to one another on the primary side 10 and the secondary side 11. Thereby, it is possible to reduce the distance to be bridged in a contactless manner or to provide components which interlock the primary side 10 and the secondary side 11 in a teeth-like manner for improving the efficiency of the inductive power transmission.

To achieve a simple coupling capability, the inductive transmission device 7 is implemented in such a way that its components are encapsulated from the surrounding water, wherein the air gap of the electrical generator is flooded after the coupling is achieved.

A rotary transformer represents a possible embodiment for the inductive transmission device 7 for a rotatable mount of the nacelle 2 on the support structure. It can be implemented as an asynchronous machine having a wound rotor, which is secured by a brake to maintain a specific operational position. The brake used for this purpose is preferably implemented such that it can be disengaged, to allow an azimuthal rotation of the nacelle. Correspondingly, for this case, the primary side of the rotary transformer moves in relation to the secondary side fixed on the support structure during the follow-up movement of the nacelle.

For the mentioned rotary transformer, the absolute value of the secondary voltage is unchanged in relation to the primary voltage. Only the phasing is variable as a function of the rotational position. The rotary transformer is preferably an induction machine having rotor feed, whose components are protected against the corrosive action of the surrounding water by a corrosion protection element, such as a can, or using a casting compound, so that operation in the surrounding water is possible.

Figure 2:
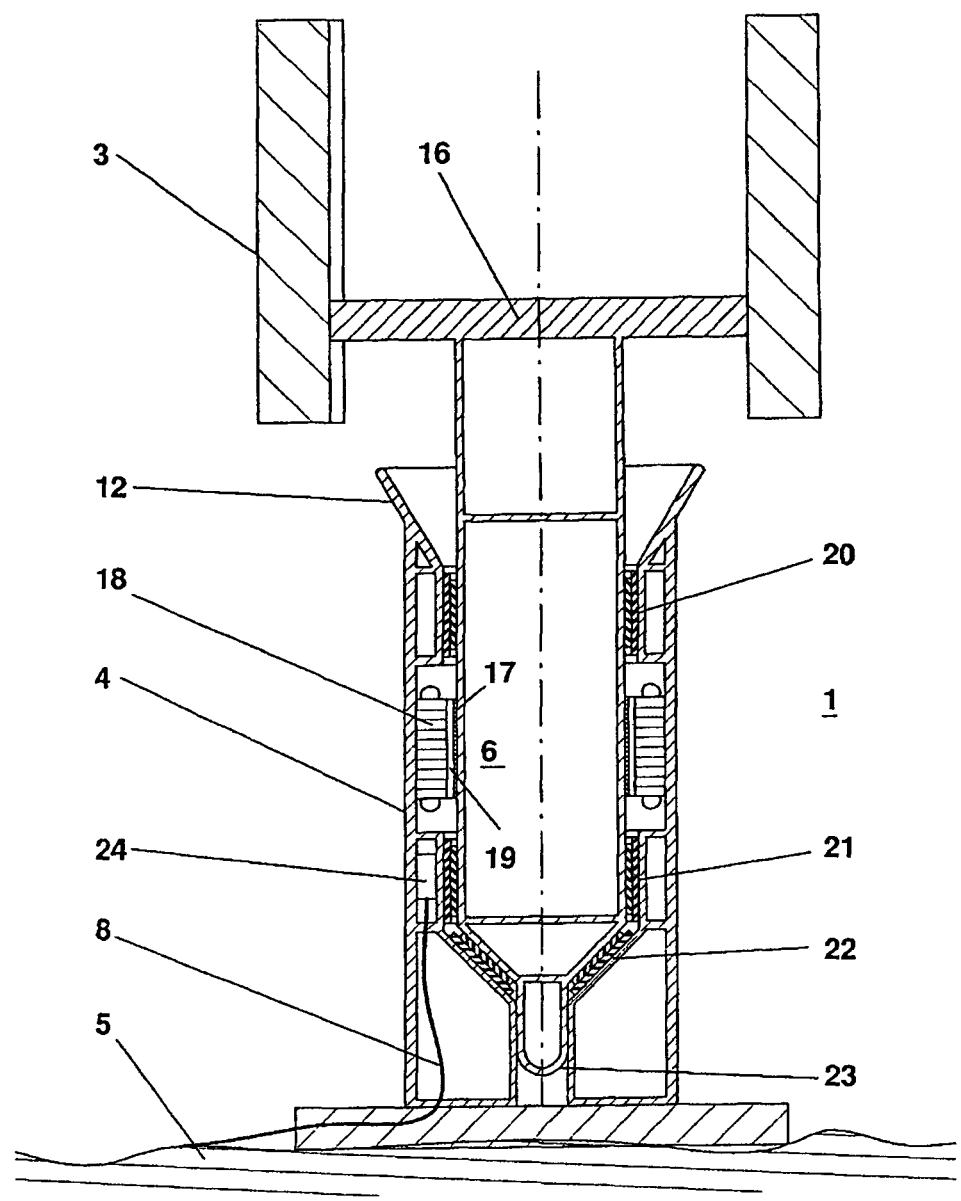
FIG. 2 shows an alternative embodiment of an underwater power plant in accordance with the invention with a divisible electrical generator as longitudinal section.

FIG. 2 shows an alternative embodiment of the invention, wherein instead of a divisible inductive transmission device, the electrical generator 6 itself represents the part of the plant to be coupled. Corresponding to the above-described embodiment, there is a contactless coupling via a magnetic interaction. There is a higher efficiency in comparison to the above-described embodiment, however, for this case the coupling between the support structure 4 and the revolving unit 16 has to be achieved with such a precision that the required air gap tolerances of the electrical generator are within the millimeter range.

FIG. 2 shows a modular underwater power plant 1 in schematically simplified form, whose water turbine 3 is implemented as a vertical rotor. The revolving part 16 carries, in addition to the water turbine 3, the generator rotor 17, which advantageously comprises permanent magnets. Furthermore, the revolving part carries the bearing segments assigned thereto of the bearings 20, 21, and 23. The counter running surfaces of these bearings are connected to the support structure 4, which has a foundation on the body of water floor 5. It receives the generator stator 18 and the frequency inverter 24, from which the power cable 8 is guided in a protected manner along the body of water floor 5.

Upon coupling of the revolving unit 16 to the support structure 4, a conical receptacle 12 in the support structure 4 is used to achieve a first alignment. Furthermore, a centering device 23 is provided on the revolving unit 16, which, in cooperation with a complementarily shaped receptacle in the support structure 4, causes the final alignment in the course of the finishing stage of the coupling. Furthermore, the diagonally placed bearing 22 supports the self-centering, so that the required tolerances of the air gap 19 are maintained between the generator rotor 17 and the generator stator 18. The air gap 19 and the areas in which the bearings 20, 21, 22 are preferably flooded by the surrounding water. Electrical components of the frequency inverter 24 and the electrically conductive parts of the generator 6 are encapsulated.

The invention claimed is:
1. An underwater power plant comprising:
a support structure;
a nacelle, the support structure and the nacelle being detachably connectable to one another via a coupling device, wherein the coupling device comprises complementary guide elements, the complimentary guide elements causing a self-centering during a connection of the nacelle and the support structure;
a water turbine, the water turbine at least indirectly driving an electrical generator that is received in the nacelle; and
an inductive transmission device, wherein the inductive transmission device transmits power generated by the electrical generator from the nacelle in a contactless manner to the support structure;
wherein the inductive transmission device comprises a transformer with a primary side and a secondary side, the primary side is connected to the nacelle and the secondary side is connected to the support structure;

wherein the inductive transmission device is part of the coupling device such that the self-centering of the coupling device guides the primary side and the secondary side of the transformer to each other, wherein the inductive transmission device is implemented on surfaces of the complementary guide elements facing toward one another.

2. The underwater power plant according to claim 1, wherein the complementary guide elements comprise a conical connecting piece on the nacelle and a conical receptacle on the support structure.

3. The underwater power plant according to claim 1, wherein the support structure is supported against a body of water floor.

* * * * *